US009970229B1

(12) United States Patent
Favila et al.

(10) Patent No.: US 9,970,229 B1
(45) Date of Patent: May 15, 2018

(54) GARAGE DOOR OPENER SYSTEM WITH AUTO-CLOSE

(71) Applicant: Sears Brands, L.L.C., Hoffman Estates, IL (US)

(72) Inventors: Angel Favila, Lake in the Hills, IL (US); Puneet Shivam, Schaumburg, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 0 days. days.

(21) Appl. No.: 15/485,930

(22) Filed: Apr. 12, 2017

(51) Int. Cl.
*B60R 25/00* (2013.01)
*E05F 15/70* (2015.01)
*E05F 15/79* (2015.01)
*E05F 15/73* (2015.01)
*E05F 15/76* (2015.01)
*E05F 15/71* (2015.01)

(52) U.S. Cl.
CPC .............. *E05F 15/70* (2015.01); *E05F 15/71* (2015.01); *E05F 15/73* (2015.01); *E05F 15/76* (2015.01); *E05F 15/79* (2015.01); *E05F 2015/767* (2015.01); *E05Y 2900/106* (2013.01)

(58) Field of Classification Search
CPC .... E05Y 2900/106; G07C 2009/00849; G07C 2009/00928
USPC ...................................... 340/5.7, 5.71, 12.22
See application file for complete search history.

(56) References Cited

U.S. PATENT DOCUMENTS 5,247,440 A 9/1993 Capurka et al.
5,278,480 A * 1/1994 Murray .................. G05B 19/42 318/266
5,357,183 A 10/1994 Lin
5,990,828 A 11/1999 King
6,002,332 A * 12/1999 King .................. G07C 9/00309 340/545.1
6,271,765 B1 8/2001 King et al.
6,437,527 B1 * 8/2002 Rhodes .............. G07C 9/00182 318/264
7,477,147 B2 1/2009 Fitzgibbon
(Continued)

OTHER PUBLICATIONS http://www.smarthome.com/xceltronix-ac100130-garage-door-autocloser.html, 1 page, dated Aug. 9, 2017.
(Continued)

*Primary Examiner* — Carlos E Garcia
(74) *Attorney, Agent, or Firm* — McAndrews, Held & Malloy, Ltd.

(57) ABSTRACT

A garage door opener system includes a motor, a sensor, a controller, and a network interface. The motor is coupled to the garage door and is configured to selectively raise the garage door and lower the garage door. The sensor is configured to monitor the doorway and distinguish between an object entering and exiting the doorway. The controller is coupled to the motor and is configured to generate signals that cause the motor to lower the garage door into a closed position based on signals received from the sensor and whether the object is entering or exiting the doorway. The network interface is configured to operatively couple the controller to a server via a network. The network interface further provides the server with information obtained from the sensor and receives a table comprising durations that the server customized based upon the received information.

19 Claims, 4 Drawing Sheets

(56) References Cited

U.S. PATENT DOCUMENTS

| | | | | |
|---|---|---|---|---|
| 7,797,881 | B2 * | 9/2010 | Loitherstein | E05F 15/74 340/932.2 |
| 7,893,811 | B2 * | 2/2011 | Augustyniak | G07C 9/025 177/25.13 |
| 8,299,893 | B2 | 10/2012 | Mullet | |
| 8,311,490 | B2 | 11/2012 | Witkowski et al. | |
| 8,643,467 | B2 | 2/2014 | Chutorash et al. | |
| 9,176,482 | B2 | 11/2015 | Witkowski et al. | |
| 9,230,378 | B2 | 1/2016 | Chutorash et al. | |
| 9,836,905 | B2 * | 12/2017 | Chutorash | G07C 9/00896 |
| 2003/0052163 | A1 * | 3/2003 | Habara | G06Q 20/24 235/380 |
| 2003/0102836 | A1 * | 6/2003 | McCall | E05F 15/668 318/445 |
| 2008/0130791 | A1 * | 6/2008 | Fitzgibbon | G07C 9/00182 375/310 |
| 2015/0365217 | A1 * | 12/2015 | Scholten | H04L 5/0053 370/315 |
| 2016/0057574 | A1 * | 2/2016 | Park | H04L 67/12 455/456.2 |
| 2016/0334811 | A1 * | 11/2016 | Marten | G05B 15/02 |
| 2016/0343243 | A1 * | 11/2016 | Rabb | G08B 29/185 |
| 2017/0034485 | A1 * | 2/2017 | Scalisi | H04N 7/186 |

OTHER PUBLICATIONS http://www.instructables.com/id/Arduino-Automated-Garage-Door-System, 6 pages, dated Aug. 9, 2017.

* cited by examiner

GARAGE DOOR OPENER SYSTEM WITH AUTO-CLOSE

FIELD OF THE DISCLOSURE

The present disclosure generally relates to a garage door opener system, and more specifically, to a garage door opening system that automatically closes a garage door.

BACKGROUND

Limiting the length of time a garage door is open may reduce the likelihood of intruders, neighborhood pets, rodents, and other wild life enter the garage. Ideally, the garage door is immediately closed after a person or vehicle enters the garage. Similarly, the garage door is ideally immediately closed after a person or vehicle has left the garage if the person or vehicle is not expected to immediately return to the garage. Other times, the garage door would ideally remain open until the person has returned from performing a quick errand (e.g., picking up mail, taking garbage cans to the curb, etc.) and then close immediately after such return.

Garage door opening (GDO) systems which automatically close a garage door after a predetermined time (e.g., 1, 2, 5 minutes etc.) are unable to adequately accommodate common usage scenarios. In particular, a GDO system may leave the door open for a time sufficient to accommodate quick errands. As a result, the GDO system may leave the door open much longer than needed for situations where a vehicle is simply departing the garage. Such GDO systems may alternatively close the door shortly after a person or vehicle departs. As a result, the GDO systems may close the door too early for a person to perform a quick errand and return via the open garage door.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Shown in and/or described in connection with at least one of the figures, and set forth more completely in the claims are garage door opens comprising sensors and and/or trainable logic that adjust when a garage door is closed in order to accommodate various usage.

These and other advantages, aspects and novel features of the present disclosure, as well as details of illustrated embodiments thereof, will be more fully understood from the following description and drawings.

DETAILED DESCRIPTION

Figure 1:
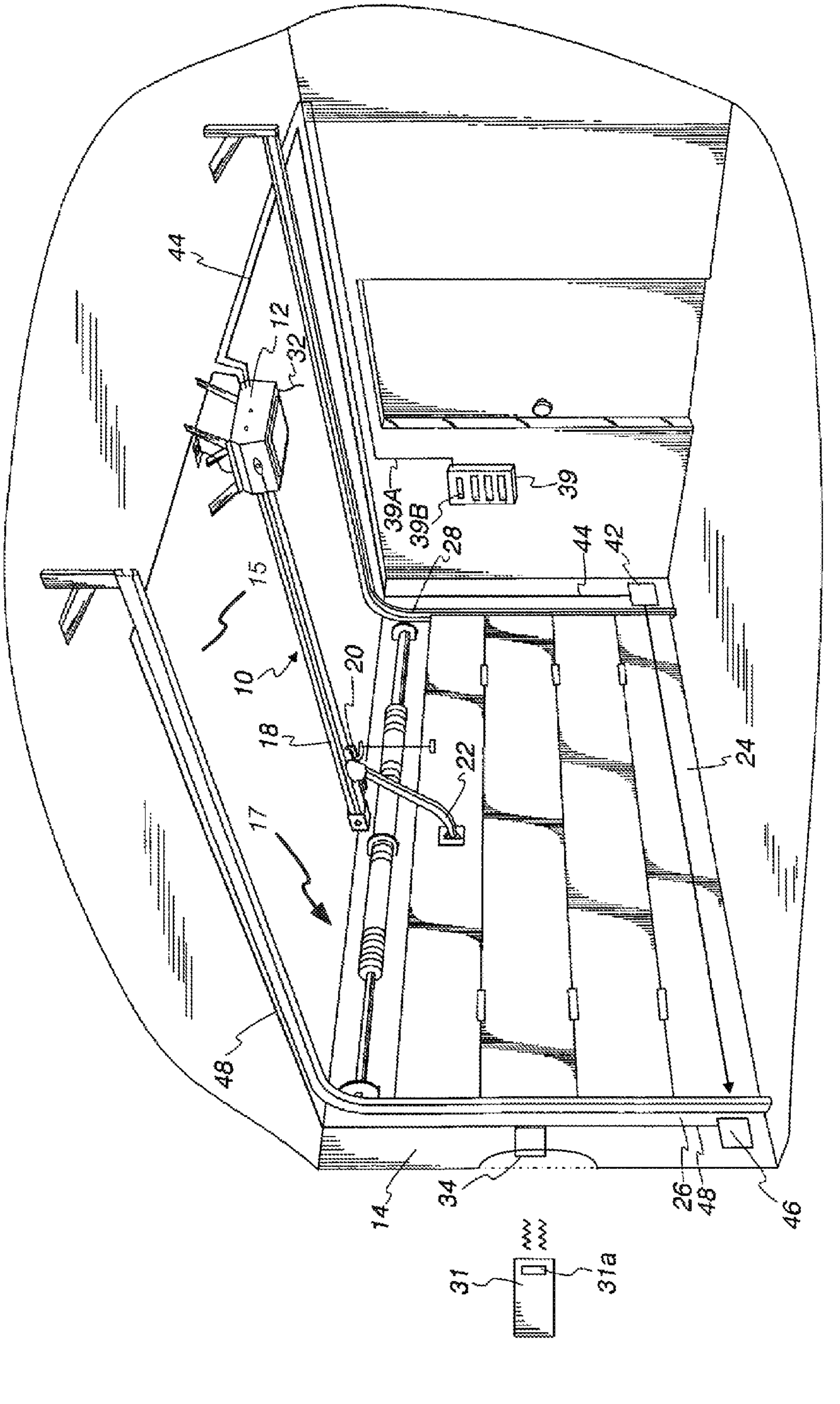
FIG. 1 provides a perspective view of an exemplary garage door opener (GDO) system in accordance with a representative embodiment of the present disclosure.

The following discussion presents various aspects of the present disclosure by way of one or more examples. Such examples are non-limiting, and thus the scope of various aspects of the present disclosure should not necessarily be limited by any particular characteristics of the provided examples. In the following discussion, the phrases “for example,” “e.g.,” and “exemplary” are non-limiting and are generally synonymous with “by way of example and not limitation,” “for example and not limitation,” and the like.

As utilized herein, “and/or” means any one or more of the items in the list joined by “and/or”. As an example, “x and/or y” means any element of the three-element set {(x), (y), (x, y)}. In other words, “x and/or y” means “one or both of x and y.” As another example, “x, y, and/or z” means any element of the seven-element set {(x), (y), (z), (x, y), (x, z), (y, z), (x, y, z)}. In other words, “x, y and/or z” means “one or more of x, y, and z.”

The terminology used herein is for the purpose of describing particular examples only and is not intended to be limiting of the disclosure. As used herein, the singular forms are intended to include the plural forms as well, unless the context clearly indicates otherwise. It will be further understood that the terms “comprises,” “includes,” “comprising,” “including,” “has,” “have,” “having,” and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as “upper,” “lower,” “side,” and the like, may be used in distinguishing one element from another element in a relative manner. It should be understood, however, that components may be oriented in different manners, for example a component may be turned sideways so that its “top” surface is facing horizontally and its “side” surface is facing vertically, without departing from the teachings of the present disclosure.

In the drawings, various dimensions (e.g., layer thickness, width, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Aspects of the present disclosure are related to garage door systems and methods of operating such garage door systems. More specifically, certain embodiments of the present disclosure relate to systems and methods that sense vehicles, persons, and other activities and close a garage door based on such sensed activities. In some embodiments, machine learning is employed to train the garage door system to recognize and reactive to activities of a particular household and close the garage door based on such training.

Figure 2:
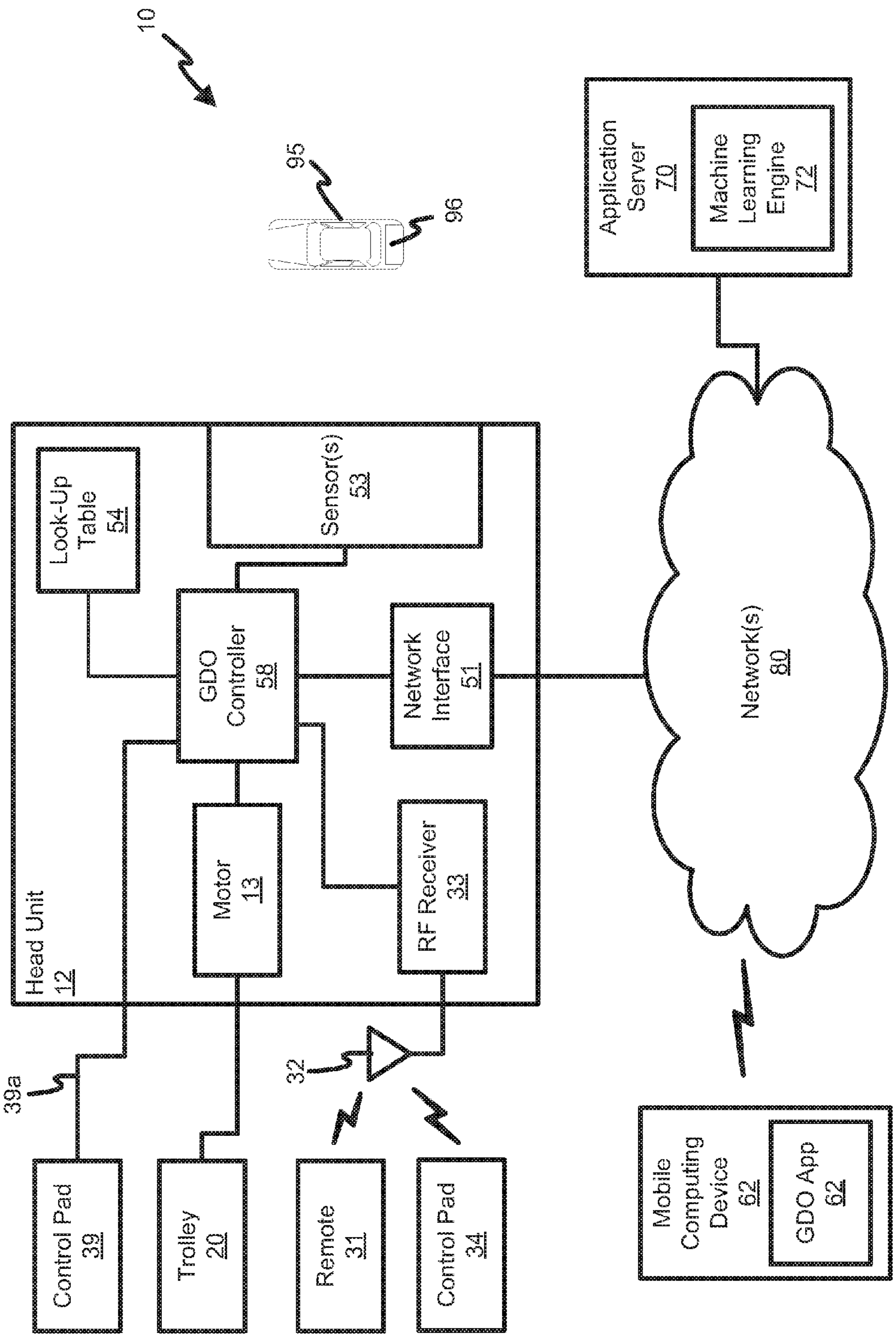
FIG. 2 provides a block diagram providing further details of the exemplary GDO system of FIG. 1.

Referring now to FIGS. 1 and 2 a garage door opener (GDO) system 10 is shown, in accordance with a representative embodiment of the present disclosure. The GDO system 10 comprises a head unit 12 mounted to a ceiling 15 of a garage 14. A rail 18 may extend along the ceiling 15 from the head unit 12 toward a doorway 17 of the garage 14. A releasable trolley 20 may be coupled to a motor 13 in head unit 12. The trolley 20 may include an arm 22 coupled to a multiple paneled garage door 24. The trolley 20 may traverse the railing, thereby raising and lowering the attached door 24 based on activation of the motor 13. The door 24 may be sized to close or seal the doorway 17 when in a closed or lowered position. Moreover, the door 24 may be movably coupled to a pair of door rails 26 and 28 via roller bearings that permit moving the door 24 away from the doorway 17 and into an opened or raised position in which the door 24 is positioned parallel to the ceiling 15.

The GDO system 10 may further include a hand-held remote 31 providing a push button 31*a*. In response to a user pressing button 31*a*, the remote 31 may transmit signals to an antenna 32 coupled to an RF receiver 33 of the head unit 12. The GDO system 10 may also include an external control pad 34 positioned on the outside of the garage 14. The external control pad 34 may include a plurality of buttons and may communicate wirelessly with the head unit 12 via radio frequency transmission and antenna 32 or may communicate with the head unit 12 via one or more transmission lines (not shown) which hard-wire the external control pad 34 to the head unit 12.

The GDO system 10 may also include an internal control pad 39, an optical emitter 42, and an optical detector 46. The internal control pad 39 may be mounted on the wall of the garage 14. The internal control pad 39 may be connected to the head unit 12 by a pair of wires 39*a*. The internal control pad 39 may include a user interface 39*b* comprising various switches, buttons, and/or displays via which a user may operate, program, and/or train the GDO system 10. For example, the user interface 39*b* may include a button that, in response to being activated, instructs the head unit 12 via wires 39*a* to raise the door 24 when closed and to lower the door 24 when open.

The optical emitter 42 may be connected via a power and signal line 44 to the head unit 12. The optical detector 46 may be connected via a wire 48 to the head unit 12. The head unit 12 may identify possible obstructions in the doorway 17 based upon whether the detector 46 receives a signal emitted by the emitter 42.

Further details of the GDO system 10 are presented via the block diagram of FIG. 2. As shown, the GDO system 10 may further include a mobile computing device 60 and an application server 70 that are operably coupled to the head unit 12 via a network 80. Moreover, the head unit 12 may further include the RF receiver 33 that receives signals from the remote 31 and external control pad 34 via antenna 32. The head unit 12 also includes a network interface 51, one or more sensors 53, a look-up table 54, and a controller 58.

The controller 58 may be operably coupled to the motor 13, the RF receiver 33, the internal control pad 39, the network interface 51, and the sensors 53. The controller 58 may include a firmware, software, a microcontroller, programmable logic devices, and/or other circuitry, which receives signals from the various components of the GDO system 10 and generates appropriate signals that cause the motor 13 to raise and lower the door 24. The controller 58 may further include a real time clock, hardware timers, software timers, and/or circuitry via which the controller 58 may determine an elapsed time period. The controller 58 may cause the motor 13 to automatically lower the door 24 and close-off the doorway 17 based on signals received from sensors 53 and/or durations set forth in the look-up table 54, which have been customized via a training process.

The sensors 53 may include a camera, a radar sensor, a respiration sensor, or other sensors for tracking vehicles, persons, and/or other objects entering/exiting the doorway 17. The controller 58 may receive signals from sensors 53 and operate the motor 13 based upon such signals. In particular, the sensors 53 may detect the location, position, velocity of a vehicle 95 and/or a person entering or exiting the garage 14 via doorway 17 and generate signals indicative of such location, position, and velocity.

To this end, the sensors 53 may include a radar sensor that is positioned in the head unit 12 to monitor the doorway 17 and track whether a vehicle 95 and/or person is entering or exiting the doorway 17. Suitable radar sensors include: the MR2001—Multi-channel 77 GHz Radar Transceiver Chipset from NXP Semiconductor N.V.; the BGT24MTR11—Silicon Germanium 24 GHz Transceiver MMIC from Infineon Technologies AG; and other radar sensors that provide 2D object target classification and tracking capabilities. In particular, such radar sensors may distinguish between whether vehicles 95 and/or persons are entering or exiting the doorway 17, the quantity of vehicles 95 and/or persons entering/exiting the doorway 17, and/or duration for which persons remain outside of garage 14 before re-entry via the doorway 17.

Alternatively or additionally, the sensors 53 may include other sensors for detecting persons, their distance from the doorway 17, and their movements (e.g., distinguishing between entering and exiting the doorway 17). For example, the sensors 53 may include a respiration detection sensor such as the XeThru X2M200 respiration sensor from Novelda AS. Such respirations sensors may be positioned in the head unit 12 and directed toward the doorway 17 in order to detect human presence and distance from doorway 17. In particular, such respiration sensors may detect presence and distance based upon movements associated with human respiration and provide the controller 58 with signals indicative of such movements.

Alternatively or additionally, the sensors 53 may include one or more cameras for detecting vehicles 95 and/or persons, their distance from the doorway 17, and their movements (e.g., distinguishing between entering and exiting the doorway 17). For example, a camera may track a vehicle, person, or other object exiting the doorway 17, may track a period of time the vehicle, person, or other object remains out of the garage 14, and then detect its return to the garage 14 via the doorway 17. The camera and associated controller may use image recognition processing algorithms and machine learning to recognize a human being from a front posture and a back side. The camera and associated controller may inform the controller 58 of a person's exit and reentry through the doorway 17.

Thus, the sensors 53 may detect and track a person exiting the doorway 17 to perform a quick errand. For example, the object tracking capability or respiration detection capability of the sensors 53 may detect a person exiting the garage 14 via the doorway 17 to either retrieve mail from the mailbox or place a garbage bin at the curb and may further detect the person's return via the doorway 17. Such tracking capabilities of the sensors 53 may also detect a person bringing grocery bags from a vehicle 95 parked outside the garage 14 or carrying other items to or from a vehicle 95 parked outside the garage 14.

Such sensors 53 may further detect whether a vehicle 95 is approaching or departing the garage 14. In particular, the sensors 53 may detect distance, speed, angle and direction of movement of the vehicle 95. The sensors 53 may further distinguish between whether the vehicle is departing or entering the garage 14. The sensors 53 such as the camera or radar may be positioned in the head unit 12 such that area of coverage includes all sides of the vehicle 95 as the vehicle 95 enters/exits the doorway 17. Moreover, the sensors 53 may determine the extent that the vehicle 95 is inside the garage 14 (e.g., completely within, completely without, partially within, percentage within, etc.)

The controller 58 may process the signals from the sensors 53 and may determine whether the vehicle 95 and/or person is exiting and entering the doorway 17 of the garage 14. The controller 58 may provide information gleaned from the processed signals to the application server 70 for further processing. The application server 70 may process the received information and ascertain and/or predict user behavior via one or more machine learning algorithms. Based on such processing, the application server 70 may send information to the controller 58 for updating durations of the look-up table 54 and/or identify an appropriate entry of the look-up table 54.

As shown, in FIG. 2, the network interface 51 may operatively couple the head unit 12 to a mobile computing device 60 and an application server 70 via one or more networks 80. The mobile computing device 60 may include tablets, smart phones, mobile phones, personal data assistants, hand-held gaming consoles, laptop computer systems, and/or other forms of mobile computing devices, which enable a user to communicate with the head unit 12 and/or applications server 70.

The networks 40 may include a number of private and/or public networks such as, for example, wireless and/or wired LAN networks, cellular networks, and the Internet that collectively provide a communication path and/or paths between the mobile computing devices 60 and application server 70.

The application server 70 may include one or more web servers, database servers, routers, load balancers, and/or other computing and/or networking devices. The application server 70 may include a machine learning engine 72, which learns the behavior of a user or users of the GDO system 10 and determines an appropriate time for closing the garage door 24 based on the machine learning feature vectors. The machine learning engine 72 comprises machine learning algorithms that identify the normal usage time pattern for opening/closing the door 24 when the GDO system 10 is in a training mode. The machine learning engine 72 may then predict a maximum duration for which to keep garage door 24 open based on usage patterns gleaned during the training mode period. The machine learning engine 72 may utilize a variety of machine learning regression algorithms like Ordinary Least Squares Regression (OLSR), Linear Regression, Logistic Regression, Stepwise Regression, Multivariate Adaptive, and others to customize the maximum time durations based on the gleaned usage patterns.

In particular, the adaptive machine-learning algorithms of the machine learning engine 70 may train based on data collected by the sensors 53 of the head unit 12. In particular, the sensors 53 (e.g., a radar sensor) may generate signals that are indicative of a person exiting the doorway 17, entering the doorway 17, as well as a duration the person remained outside the garage 14 before reentering the doorway 17. The sensors 53 may likewise generate signals that are indicative of vehicle 95 exiting the doorway 17 and entering the doorway 17. The controller 58 of the head unit 12 may receive these signals, collect information from these signals as well as other information (e.g., data corresponding to manual opening and closing of door via remote 31, external control pad 34, and/or internal control pad 39), and send the collected information the application server 70. The machine learning engine 72 of the applications server 70 may utilize the received information as training data while the GDO system 10 is in a training mode. The machine learning engine 72 uses the received training data to determine/predict an upper threshold of time for which the garage door 24 should remain open to accommodate the user's usage patterns. The machine learning engine 72 may also retrain itself in cases where the user closes the garage door 24 manually before the head unit 12 automatically closed the door 24.

The application server 70 may create a table that associates all possible combinations of machine learning feature vectors with an upper duration for which garage door 24 is to remain open. The application server 70 may transfer the created table to the head unit 12. The head unit 12 may locally store the received table as look-up table 54.

The machine learning engine uses the above mentioned data to train itself in the context of following parameters as feature vectors.

Work Days:

On working days, people generally have a consistent schedule in which they leave for work via the doorway 17 at a relatively, consistent time and return from work via the doorway 17 at a relatively, consistent time. As such, garage door operation may be fairly consistent during work days. The machine learning engine 70 may glean such consistent workday pattern from the training data and determine the duration to keep the door open for future work day events.

Calendar Events:

The machine learning engine 72 may further adjust the duration for which the door 24 remains open based on calendar events. Calendar events such as attending holiday parties; dropping children off for school, practice, etc., collecting trash bins on trash pick-up day, etc. may set forth predictable usage patterns of the GDO system 10 for which the machine learning algorithm may adjust the durations in the table.

Shopping:

On days of week when people usually shop, they may bring items inside the house via garage 14 with the vehicle 95 parked outside. The garage door opening duration times on such days may differ from other days. The sensor 53 may detect a person carrying shopping bags from outside garage 14. The GDO system may determine and adjust the time duration for which door 24 remains open based on such detection.

Credit Card Spending:

The machine learning engine 72 may further utilize input from credit card companies to adjust the duration for which the door 24 remains open. In particular, the machine learning engine 72 based on such credit card data may determine when grocery shopping is performed. Grocery shopping and other credit card activities may signify events in which the duration the garage door remains open should be increased in order for persons to bring purchased items inside the house via the doorway 17.

Vacation Days/Holidays:

The machine learning engine 72 may utilize data regarding holidays and vacation days. Such data may signify periods in which the garage door operation will differ from the norm. Thus, the machine learning engine 72 may adjust the duration the door 24 remains opens based on such vacation/holiday data.

Extreme Weather Conditions:

The machine learning engine 72 may further account for severe weather conditions such as, for example, tornados, rains, snows, extreme heat, extreme cold, etc. In particular, the machine learning engine 72 may reduce the duration for which the door 24 remains open in response to such extreme conditions.

Time for which User Stays Outside Garage:

The sensors 53 may detect the duration of time the person remains outside the garage 14 before reentry via the doorway 17. The machine learning engine 72 may adjust durations for which the door 24 remains open based upon this observed behavior. In particular, the machine learning engine 72 may determine and specify a maximum duration for which the garage door 17 is to remain open when the person is outside.

Vehicle Input for Emptying Shopping Bags:

The vehicle 95 in some embodiments includes a sensor 96. The sensor 96 may monitor presence of shopping bags and items in a trunk and/or other interior area of the vehicle 95 and send signals indicative of whether all bags and/or items have been removed from the trunk or interior area. For example, the sensors 96 may include weight/volume sensors in the trunk and other places to determine if the vehicle is empty of shopping bags and other items The mobile computing device 60 may include a GDO application 62 that provides a user of the GDO system 10 with an extended user interface for interacting with the head unit 12 and/or application server 70. In particular, the GDO application 62 may provide the user with the option to enable and disable the machine learning aspects of the GDO system 10. The GDO application 62 may further provide the user with the option to start and/or end a training mode of the GDO system 10. In particular, the GDO application 62 may permit the user to specify a duration of the training mode by specifying a start date and/or time, an end date and/or time, and/or a number of garage door open/close cycles.

The GDO application 62 may further provide the user an option to initiate a relearning or retraining process via the mobile computing device 60. In response to initiating a relearning/retraining process, the machine learning engine 72 may discard prior collected data and prior determined durations for the table 54 and reinitiate the learning process based on newly acquired data from the head unit 12. The GDO application 62 may further provide the user options to enter various machine learning feature vectors such as holidays, vacation days, work days, school days, etc.

Figure 3:
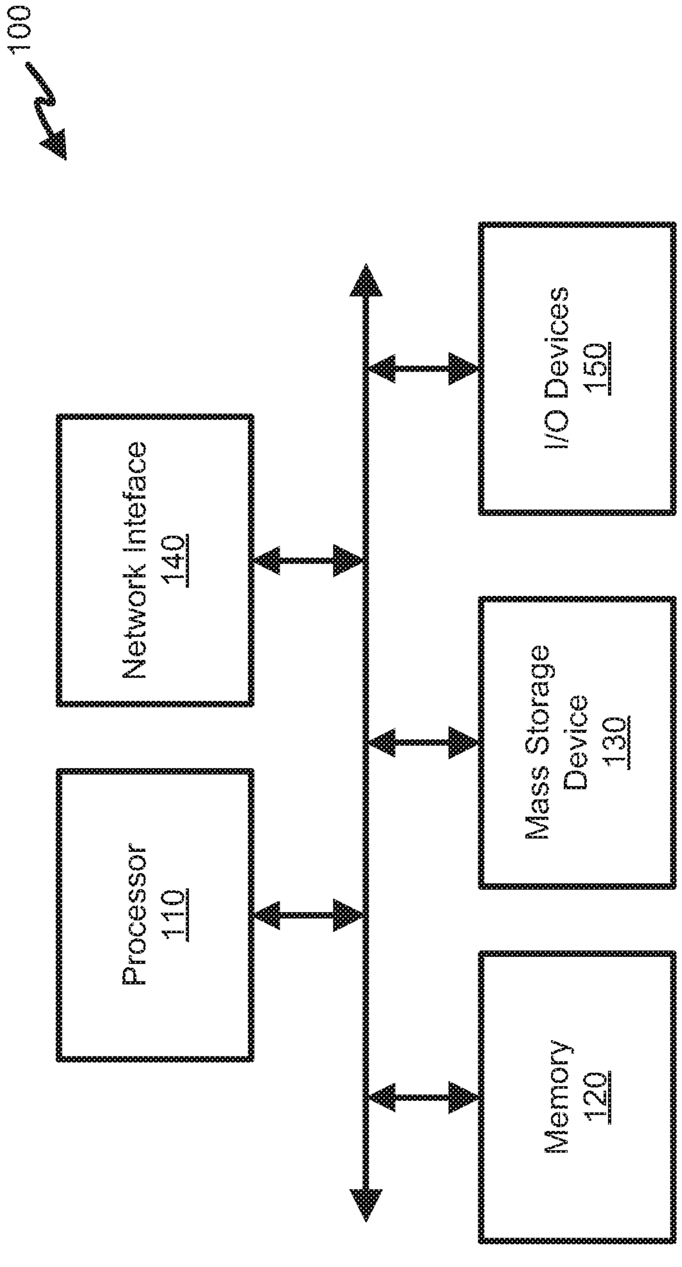
FIG. 3 provides a block diagram of a computing device architecture that may be utilized to implement one or more computing devices and controllers of the GDO system of FIGS. 1 and 2.

In some embodiments, aspects of the mobile computing device 60, the application server 30, and the controller 58 of the head unit 12 may be implemented using various types of computing devices. FIG. 3 provides a simplified depiction of a computing device 100 suitable for such aspects of the GDO system 10. As shown, the computing device 100 may include a processor 110, a memory 120, a mass storage device 130, a network interface 140, and various input/output (I/O) devices 150. The processor 110 may be configured to execute instructions, manipulate data and generally control operation of other components of the computing device 100 as a result of its execution. To this end, the processor 110 may include a general purpose processor such as an x86 processor or an ARM processor, which are available from various vendors. However, the processor 110 may also be implemented using an application specific processor, a microcontroller, programmable logic devices, and/or other circuitry.

The memory 120 may include various types of random access memory (RAM) devices, read only memory (ROM) devices, flash memory devices, and/or other types of volatile or non-volatile memory devices. In particular, such memory devices of the memory 120 may store instructions and/or data to be executed and/or otherwise accessed by the processor 110. In some embodiments, the memory 120 may be completely and/or partially integrated with the processor 110.

In general, the mass storage device 130 may store software and/or firmware instructions, which may be loaded in memory 120 and executed by processor 110. The mass storage device 130 may further store various types of data (e.g., look-up table 54), which the processor 110 may access, modify, and/otherwise manipulate in response to executing instructions from memory 120. To this end, the mass storage device 130 may comprise one or more redundant array of independent disks (RAID) devices, traditional hard disk drives (HDD), sold state device (SSD) drives, flash memory devices, read only memory (ROM) devices, and/or other types of nonvolatile storage devices.

The network interface 140 may enable the computing device 100 to communicate with other computing devices via network 80. To this end, the networking interface 140 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc), and/or some other type of networking interface capable of providing a communications link between the computing device 100 and/or another computing device via network 80.

Finally, the I/O devices 150 may generally provide devices, which enable the computing device 100 to interact and respond to users and/or the surrounding environment. For example, the I/O devices 150 may include display screens, keyboards, mice, touch screens, microphones, audio speakers, digital cameras, optical scanners, RF transceivers, etc. Moreover, in the case of the head unit, the I/O devices 150 may further include the sensors 53, which may include radar, cameras, respiratory sensors, and/or other devices for tracking users, vehicles, bags, and/or other articles.

While the above provides some general aspects of a computing device 100, those skilled in the art readily appreciate that there may be significant variation in actual implementations of a computing device. For example, a smart phone implementation of a computing device generally uses different components and may have a different architecture than application server implementation of a computing device. However, despite such differences, computing devices generally include processors that execute software and/or firmware instructions in order to implement various functionality. As such, the above described aspects of the computing device 100 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Figure 4:
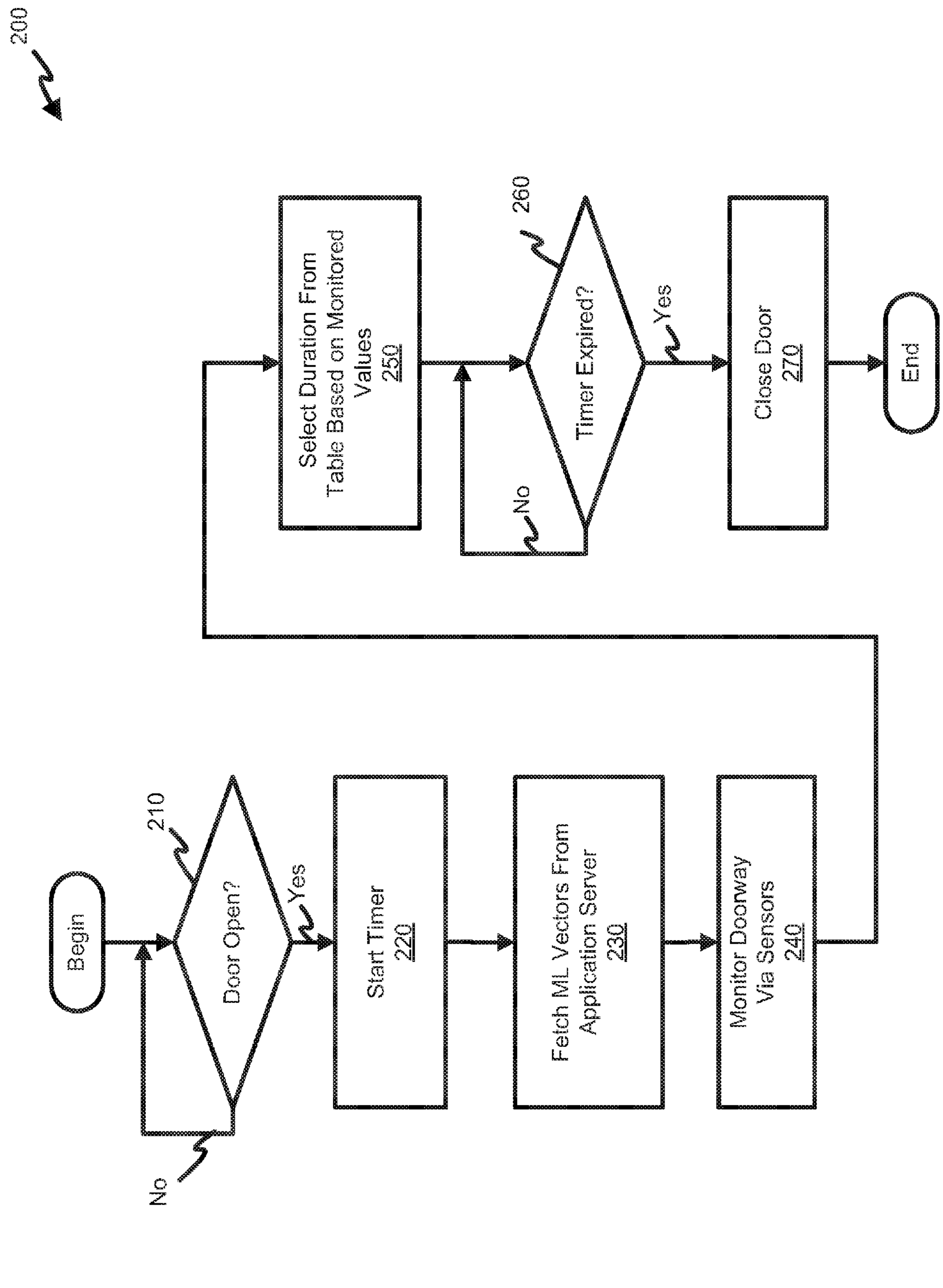
FIG. 4 provides a flowchart of a process that may be implemented by the GDO system of FIGS. 1 and 2 to automatically close a garage door.

Referring to FIG. 4, a flowchart of a process for automatically closing the door 24 is shown. At 210, the controller 58 of the head unit 12 may determine whether the door 24 is open. In some embodiments, the controller 58 causes the motor 13 to open or close the door 24 in response to signals from remote 31, control pad 34, or control pad 39. As such, the controller 58 may determine whether the door 24 is open by tracking whether signals to close or open the door have been received from the remote 31 or control pads 34, 39. In other embodiments, the controller 58 may determine whether the door 24 is open based on signals generated to cause the motor 13 to open or close the door 24. If the door 24 is not open, the controller 58 may continue to monitor the door 24 at 210 until the door 24 is open. If the door is open, the controller 58 may proceed to 220.

At 220, the controller 58 may initiate a timer to track a duration that the door 24 is open. In other embodiments, the controller 58 may access a real-time clock and record the time corresponding to when the door was opened.

After making note of when the door was opened or starting a timer, the controller 58 at 230 may contact the application server 70 to obtain the current feature values or machine learning (ML) vectors. In particular, the controller 58 may send a query to the application server 70 via its network interface 51. In response to the query, the application server 70 may identify the features values or ML vectors associated with the table 54. As explained above, the table 54 includes durations which the application server 70 created and customized for the particular head unit 12 and which are associated with the possible feature values. For example, the application server 70 may provide the controller 58 with the feature values (e.g., holiday, work day, weather condition, etc.) that correspond to the duration values in the look-up table 54.

At 240, the sensors 53 may sense vehicles and persons entering and/or exiting the doorway 17 and generate signals indicative of such sensed aspects. The controller 58 may receive signals received from sensors 53. In particular, the sensors 53 may detect the location, position, velocity of a vehicle 95 and/or a person moving into/out of the garage 14 and generate signals indicative of such location, position, velocity. The controller 58 may process the received signals and determines if the vehicle 95 and/or person is exiting or entering the doorway 17 of the garage 14.

At 250, the controller 58 may select a duration from the table 54 based on the signals received from sensors 53. The controller 58 at 260 may determine whether the door 24 has been opened for the selected duration. In particular, the controller 58 may determine whether the timer started at 220 has been running for at least the selected duration. Alternatively, the controller 58 may access a real-time clock and determine whether the duration between the time noted at 220 and the present time exceeds the duration selected from the table 54.

If the door 24 has been opened longer the selected duration, then the controller 58 generates signals which cause the motor 13 to lower and close the door 24. In this manner, the GDO system may customize the automatic closing of the door 24 based on observed, training behavior and machine learning algorithms.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices or controllers operating a garage door per a table of durations generated based on training data. Such instructions, when executed by one or more computing devices, may also result in the one or more computing devices or controllers training a garage door opener system to close a door automatically based on observed usage behavior.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A garage door opener system for use with a garage having a doorway and garage door for closing the doorway, the garage door opener system, comprising:
- a head unit mounted to a ceiling of the garage, the head unit comprising a motor, a sensor, and a controller; and
- a network interface configured to operatively couple the controller to a server via a network;
- wherein the motor is coupled to the garage door and is configured to selectively raise the garage door and lower the garage door;
- wherein the sensor is configured to monitor the doorway and distinguish between an object entering the doorway and the object exiting the doorway;
- wherein the controller is coupled to the motor and is configured to generate signals that cause the motor to lower the garage door into a closed position based on signals received from the sensor and whether the object is entering or exiting the doorway; and
- wherein the controller is further configured to provide the server with training information that is based upon signals received from the sensor and receive a table comprising durations that the server customized based upon the training information.

2. The garage door opener system of claim 1, wherein the controller is further configured to select a duration from the table based on the signals from the sensor and cause the motor to close the door after the door has been opened for the selected duration.

3. The garage door opener system of claim 1, wherein:
- the object is a person;
- the sensor comprises a radar sensor directed toward the doorway; and
- the radar sensor is configured to distinguish between the person entering the doorway and the person exiting the doorway.

4. The garage door opener system of claim 1, wherein:
- the object is a person;
- the sensor comprises a respiration sensor directed toward the doorway; and
- the respiration sensor is configured to distinguish between the person entering the doorway and the person exiting the doorway.

5. A garage door opener system for use with a garage having a doorway and garage door for closing the doorway, the garage door opener system, comprising:

a head unit mounted to a ceiling of the garage, the head unit comprising a motor, a sensor, and a controller; and another sensor in a trunk of a vehicle;

wherein the motor is coupled to the garage door and is configured to selectively raise the garage door and lower the garage door;

wherein the sensor is configured to monitor the doorway and distinguish between an object entering the doorway and the object exiting the doorway;

wherein the controller is coupled to the motor and is configured to generate signals that cause the motor to lower the garage door into a closed position based on signals received from the sensor and whether the object is entering or exiting the doorway;

wherein the other sensor is configured to detect the presence of bags in the trunk of the vehicle; and wherein the controller is further configured to cause the motor to lower the door based on signals received from the other sensor.

6. The garage door opener system of claim 5, wherein the controller is further configured to select a duration from the table based on the signals from the sensor and cause the motor to close the door after the door has been opened for the selected duration.

7. The garage door opener system of claim 5, wherein:

the object is a person;

the sensor comprises a radar sensor directed toward the doorway; and the radar sensor is configured to distinguish between the person entering the doorway and the person exiting the doorway.

8. The garage door opener system of claim 5, wherein:

the object is a person;

the sensor comprises a respiration sensor directed toward the doorway; and the respiration sensor is configured to distinguish between the person entering the doorway and the person exiting the doorway.

9. A method for use with a garage having a doorway and garage door for closing the doorway, the method comprising:

monitoring the doorway with a sensor in the garage that is configured to distinguish between an object entering the doorway and the object exiting the doorway;

collecting, over a training period, training data based on signals generated by the sensor;

transmitting the training data to an application server via a network to obtain a table of durations that have been customized based on the training data; and lowering the garage door into a closed position based on signals received from the sensor and the table of durations received from the application server.

10. The method of claim 9, further comprising:

selecting a duration from the table based on signals from the sensor;

wherein said lowering the door comprises lowering the door after determining the door has been opened for the selected duration.

11. The method of claim 10, wherein said selecting the duration is based further on detected weather conditions.

12. The method of claim 10, wherein said selecting the duration is based further on credit card activity.

13. The method of claim 10, wherein said selecting the duration is based further on calendar events.

14. The method of claim 10, wherein said selecting the duration is based further on whether a work day.

15. The method of claim 10, wherein said selecting the duration is based further on whether a holiday.

16. The method of claim 9, further comprising:

receiving signals from another sensor in a trunk of a vehicle, wherein the other sensor is configured to detect the presence of bags in the trunk of the vehicle; and wherein said lowering the door comprises lowering the door after determining based on signals received from the another sensor that bags are no longer present in the vehicle.

17. The method of claim 9, wherein:

the object is a person and the sensor comprises a respiration sensor directed toward the doorway;

said monitoring the doorway comprises monitoring the doorway with the respiration sensor to distinguish between the person entering the doorway and the person exiting the doorway; and said lowering is based on detected respiration of the person entering or exiting the doorway.

18. The method of claim 9, wherein:

the sensor comprises a radar sensor directed toward the doorway; and said lowering is based on detecting, via the radar sensor, whether an object is entering or exiting the doorway.

19. The method of claim 9, wherein:

the sensor comprises a camera directed toward the doorway; and said lowering is based on detecting, via the radar sensor, whether the object is entering or exiting the doorway.

* * * * *